(12) United States Patent
Chen et al.

(10) Patent No.: US 6,594,328 B1
(45) Date of Patent: Jul. 15, 2003

(54) METHOD AND APPARATUS FOR FACILITATING AN ESTIMATION OF A CARRIER FREQUENCY ERROR IN A RECEIVER OF A WIRELESS COMMUNICATION SYSTEM

(75) Inventors: Weizhong Chen, Keller, TX (US); Leo George Dehner, Southlake, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/362,267

(22) Filed: Jul. 28, 1999

(51) Int. Cl.$^7$ .............................. H04L 7/00; H04L 27/16
(52) U.S. Cl. ........................................ 375/368; 375/326
(58) Field of Search ................................. 375/316–352, 375/326, 368; 377/47; 370/395.2

(56) References Cited

U.S. PATENT DOCUMENTS

| | | | |
|---|---|---|---|
| 5,799,038 A | * | 8/1998 | Nowara et al. ........... 370/395.2 |
| 5,920,598 A | * | 7/1999 | Hyakudai et al. ............ 375/368 |
| 6,047,033 A | * | 4/2000 | Chen ........................... 377/47 |
| 6,289,041 B1 | * | 9/2001 | Krasner ....................... 370/294 |

OTHER PUBLICATIONS

U.S. patent application Ser. No. 09/238,395, Chen, filed Jan. 27, 1999.
U.S. patent application Ser. No. 09/309,124, Chen, filed May 10, 1999.

* cited by examiner

Primary Examiner—Stephen Chin
Assistant Examiner—Lawrence Williams
(74) Attorney, Agent, or Firm—Matthew C. Loppnow; R. Louis Breeden

(57) ABSTRACT

A receiver (200) receives (402) a first signal including a sync portion (308) having a carrier acquisition segment (302) and a timing synchronization pattern (304), and a processing system (216) of the receiver calculates (404) a first plurality of squared magnitude Fourier transforms at a first plurality of frequencies on the carrier acquisition segment. The processing system derives (406) an initial carrier frequency error estimate by locating a peak in the first plurality of squared magnitude Fourier transforms, and corrects (408) the sync portion according to the initial carrier frequency error estimate, thereby producing a carrier-corrected sync portion. The processing system then removes (410) the timing synchronization pattern from the carrier-corrected sync portion, thereby producing a second signal having a residual carrier error.

14 Claims, 4 Drawing Sheets

METHOD AND APPARATUS FOR FACILITATING AN ESTIMATION OF A CARRIER FREQUENCY ERROR IN A RECEIVER OF A WIRELESS COMMUNICATION SYSTEM

FIELD OF THE INVENTION

This invention relates in general to wireless communication systems, and more specifically to a method and apparatus for facilitating an estimation of a carrier frequency error in a receiver of a wireless communication system, that mitigates effects of Doppler frequency shift.

BACKGROUND OF THE INVENTION

Some applications, such as the low-power side of an asymmetrical two-way messaging system, require high-sensitivity receivers. To conserve battery power in the portable subscriber units, such systems utilize low-power transmitters for the inbound (portable-to-base) links. To help rebalance the inbound and outbound link gains, extensive measures are taken to maximize the sensitivity of the base receiver.

One such measure is to utilize a multi-symbol matched filter (MSMF) receiver as the base receiver. The MSMF receiver provides excellent sensitivity. Prior-art MSMF receivers, however, have lost sensitivity when the reception environment includes time-variant Doppler frequency shift. Such frequency shift can occur when a portable subscriber unit is moving rapidly, as when in a motor vehicle. The loss of sensitivity occurs because the carrier acquisition techniques of the prior-art MSMF receivers have not been able to track the Doppler frequency shift adequately.

Thus, what is needed is a method and apparatus for facilitating an estimation of a carrier frequency error in a receiver of a wireless communication system, that mitigates the effects of Doppler frequency shift.

SUMMARY OF THE INVENTION

An aspect of the present invention is a method for facilitating an estimation of a carrier frequency error in a receiver of a wireless communication system, that mitigates effects of Doppler frequency shift. The method comprises the steps of receiving a first signal comprising a sync portion including a carrier acquisition segment and a timing synchronization pattern, and calculating a first plurality of squared magnitude Fourier transforms at a first plurality of frequencies on the carrier acquisition segment. The method further comprises the steps of deriving an initial carrier frequency error estimate by locating a peak in the first plurality of squared magnitude Fourier transforms, and correcting the sync portion according to the initial carrier frequency error estimate, thereby producing a carrier-corrected sync portion. The method further comprises the step of removing the timing synchronization pattern from the carrier-corrected sync portion, thereby producing a second signal having a residual carrier error.

Another aspect of the present invention is a receiver in a wireless communication system for facilitating an estimation of a carrier frequency error that mitigates effects of Doppler frequency shift. The receiver comprises a receiver element for receiving a first signal comprising a sync portion including a carrier acquisition segment and a timing synchronization pattern, and a processing system coupled to the receiver element for processing the sync portion. The processing system is programmed to calculate a first plurality of squared magnitude Fourier transforms at a first plurality of frequencies on the carrier acquisition segment, and to derive an initial carrier frequency error estimate by locating a peak in the first plurality of squared magnitude Fourier transforms. The processing system is further programmed to correct the sync portion according to the initial carrier frequency error estimate, thereby producing a carrier-corrected sync portion, and to remove the timing synchronization pattern from the carrier-corrected sync portion, thereby producing a second signal having a residual carrier error.

DETAILED DESCRIPTION OF THE DRAWINGS

Figure 1:
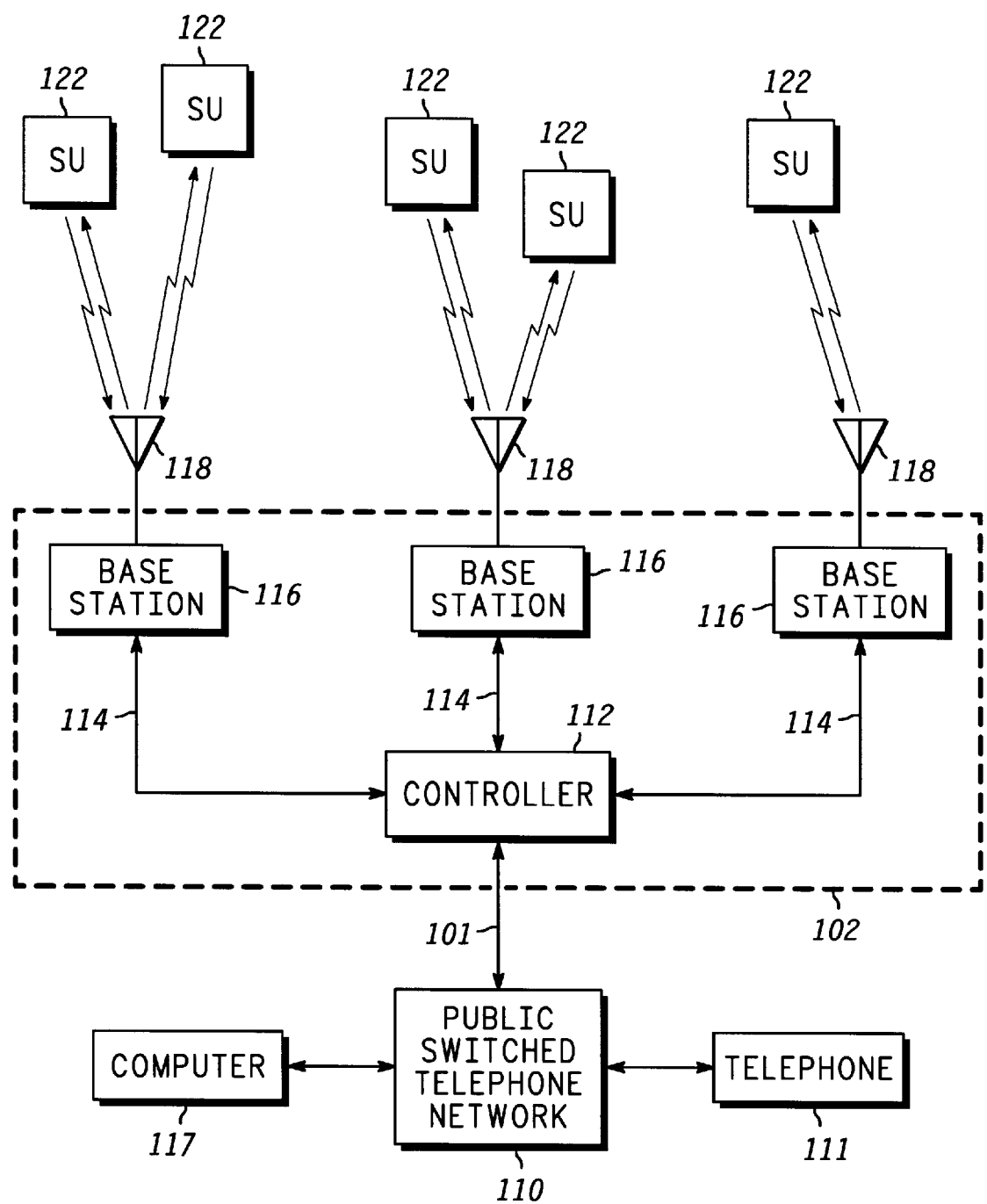
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of base stations 116, the communication system also including a plurality of conventional subscriber units 122. The base stations 116 preferably communicate with the subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc. The hardware of the base stations 116 is preferably a combination of the RF-Orchestra!™ transmitter and the RF-Audience!™ communication receiver manufactured by Motorola, Inc. The software of the communication receiver is preferably modified in accordance with the present invention, as described further below. The subscriber units 122 are preferably similar to PageWriter™ 2000 data subscriber units, also manufactured by Motorola, Inc. It will be appreciated that other similar hardware can be used as well for the controller 112, the base stations 116, and the subscriber units 122.

Each of the base stations 116 transmits RF signals to the subscriber units 122 via an antenna 118. The base stations 116 preferably each receive RF signals from the plurality of subscriber units 122 via the antenna 118. It will be appreciated that separate antennas can be utilized by the base transmitter and base receiver, as well. It will be further appreciated that dual antennas can be used for the base receiver to provide a space-diversity reception. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the preferred embodiment is a two-way wireless communication system, as depicted in FIG. 1, many aspects of the present invention also are applicable to a one-way wireless communication system, as well. Indeed, the present invention can be applied in the receiver portions of both the base station 116 and the subscriber unit 122, if desired, for better performance in both outbound and inbound directions.

Figure 2:
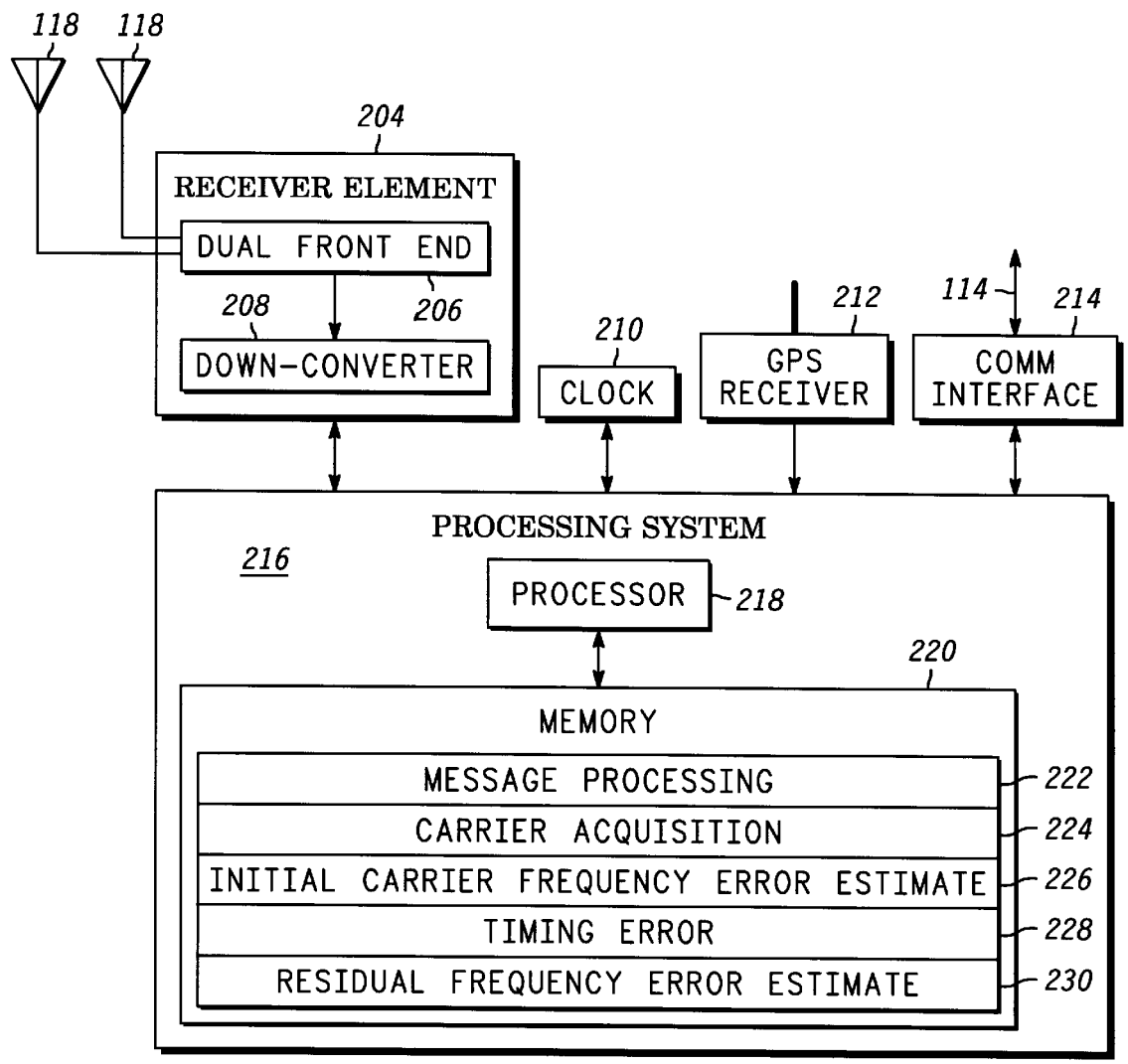
FIG. 2 is an electrical block diagram of an exemplary communication receiver utilized in the base station in accordance with the present invention.

FIG. 2 is an electrical block diagram of an exemplary communication receiver 200 preferably utilized in the base station 116 in accordance with the present invention. The communication receiver 200 preferably comprises dual antennas 118 for intercepting an inbound transmission comprising a modulated signal from the portable subscriber unit 122. The modulation type is preferably frequency shift keyed (FSK) modulation. It will be appreciated that, alternatively, other types of modulation, e.g., quadrature amplitude modulation (QAM), can be utilized as well. The antenna 118 preferably is coupled to two conventional front ends 206 of a receiver element 204 for receiving the modulated signal. A conventional, dual-channel down-converter 208 is coupled to the two front ends 206 for down-converting the modulated signals to baseband. The receiver element 204 is coupled to a processing system 216, including a conventional processor 218, preferably a digital signal processor (DSP), for synchronizing the receiver 200 with the symbol timing and for detecting the symbols in the baseband signal. The processor 218 is coupled to a conventional memory 220 comprising storage for variables and software elements for programming the processor 218 to perform carrier acquisition in accordance with the present invention. It will be appreciated that, alternatively, a single antenna 118 and a single-channel receiver element can be utilized in accordance with the present invention.

The memory 220 comprises a message processing element 222 for programming the processing system 216 to process inbound messages received by the communication receiver 200 in accordance with the present invention. The memory 220 further comprises a carrier acquisition program 224 for programming the processing system 216 to estimate a carrier frequency error in a manner that mitigates the effects of Doppler frequency shift, in accordance with the present invention. The memory 220 also includes space for storing an initial carrier frequency estimate 226. The memory further comprises space for storing a timing error 228 and a residual frequency error estimate 230 determined in accordance with the present invention.

The communication receiver 200 also preferably includes a conventional clock 210 coupled to the processing system 216 for providing a timing signal thereto. The communication receiver 200 further preferably comprises a conventional Global Positioning Satellite (GPS) receiver 212 coupled to the processing system 216 for sending a periodic timing mark to the processing system 216 in accordance with the present invention. It will be appreciated that, alternatively, some other type of time reference different from GPS can be utilized for generating the periodic timing mark. In addition, the processing system 216 is coupled to a conventional communication interface 214 for communicating with the controller 112 through the communication link 114. Operation of the communication receiver 200 in accordance with the present invention will be described further herein below.

Figure 3:
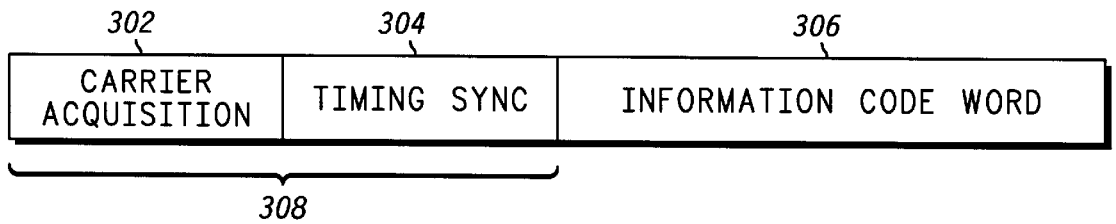
FIG. 3 is a exemplary timing diagram of a message packet in accordance with the present invention.

FIG. 3 is a exemplary timing diagram of a message packet 300 received by the receiver 200 in accordance with the present invention. The message packet 300 comprises a sync portion 308 including a carrier acquisition segment 302, preferably consisting of unmodulated carrier; and a timing synchronization pattern 304, preferably consisting of a predetermined sequence of symbols. The sync portion 308 is preferably followed by an information code word 306. It will be appreciated that other similar message packet structures can be used as well in accordance with the present invention.

Figure 4:
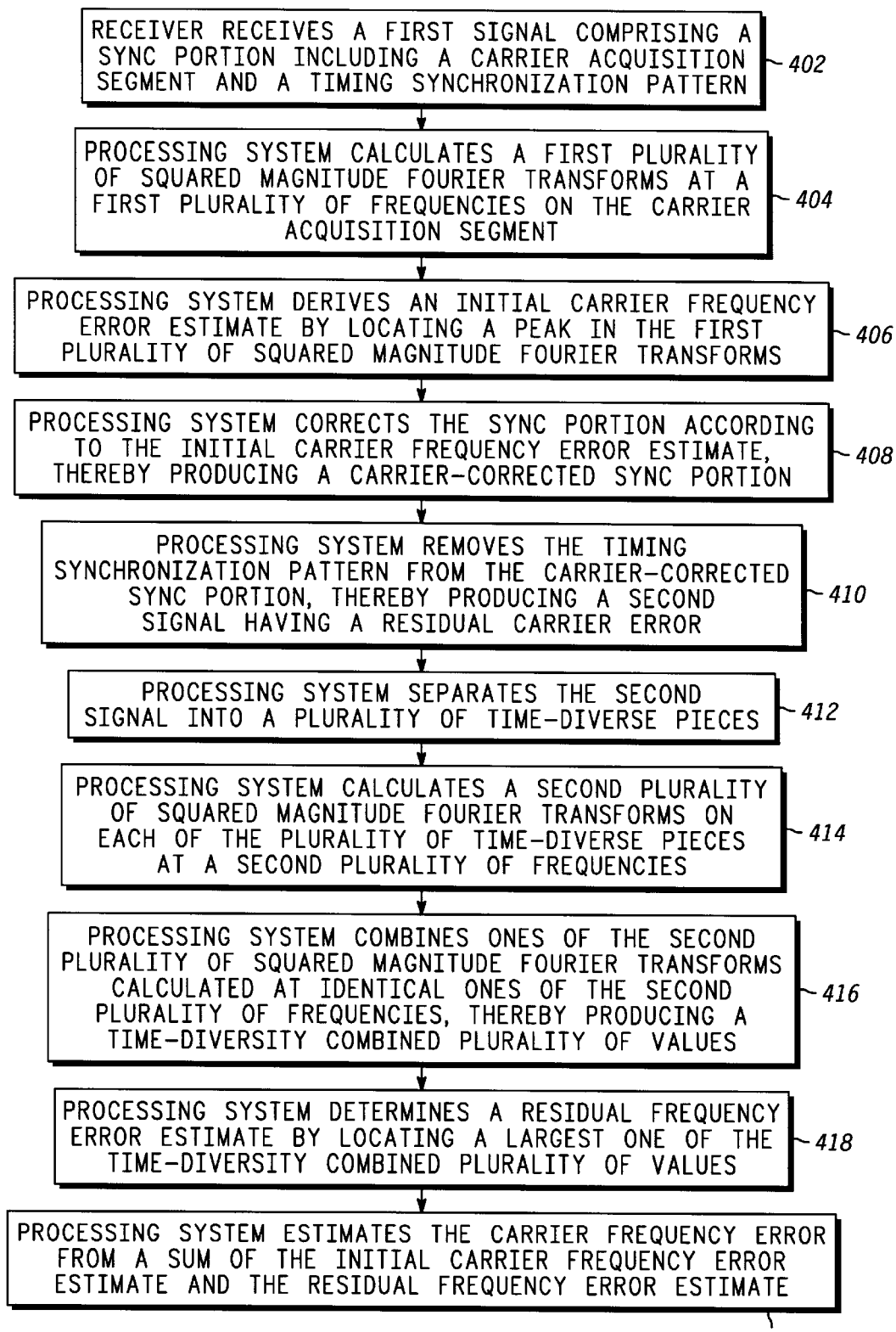
FIG. 4 is a flow diagram depicting an operation of the communication receiver in accordance with the present invention.

FIG. 4 is a flow diagram depicting a carrier acquisition operation of the communication receiver 200 in accordance with the present invention. The flow begins with the receiver 200 receiving 402 a first signal comprising the sync portion 308 including the carrier acquisition segment 302 and the timing synchronization pattern 304. The processing system 216 then calculates 404 a first plurality of squared magnitude Fourier transforms, preferably discrete-time Fourier transforms (DTFTs), at a first plurality of frequencies on the carrier acquisition segment. The processing system 216 then derives 406 the initial carrier frequency error estimate 226 by locating a peak in the first plurality of squared magnitude Fourier transforms. When diversity reception is utilized, as is preferred, the receiver 200 receives at least two space-diverse signals comprising the sync portion, and combines squared magnitude Fourier transforms calculated at the first plurality of frequencies on the carrier acquisition segment 224 of each of the at least two space-diverse signals.

Next, the processing system corrects 408 the sync portion 308 according to the initial carrier frequency error estimate 226, thereby producing a carrier-corrected sync portion. Then the processing system 216 estimates the timing error 228 from the carrier-corrected sync portion, corrects the timing error 228, and then removes 410 the timing synchronization pattern 304 from the carrier-corrected sync portion, thereby producing a second signal having a residual carrier error.

The processing system 216 then separates 412 the second signal into a plurality of time-diverse pieces, and calculates 414 a second plurality of squared magnitude Fourier transforms, preferably DTFTs, on each of the plurality of time-diverse pieces at a second plurality of frequencies. The processing system 216 then combines 416 ones of the second plurality of squared magnitude Fourier transforms calculated at identical ones of the second plurality of frequencies, thereby producing a time-diversity-combined plurality of values. When diversity reception is used, the processing system 216 preferably combines ones of the second plurality of squared magnitude Fourier transforms calculated at identical ones of the second plurality of frequencies on the carrier acquisition segment of each of the at least two space-diverse signals. The processing system 216 next determines 418 the residual frequency error estimate 230 by locating a largest one of the time-diversity-combined plurality of values. Then the processing system 216 estimates 420 the carrier frequency error as a sum of the initial carrier frequency error estimate 226 and the residual frequency error estimate 230. The carrier acquisition technique in accordance with the present invention will now be described in somewhat greater detail below.

Step 1. Derive an Initial Carrier Estimate.
  a) Let the symbols of the carrier acquisition segment 302 for two diversity branches 0 and 1 be $x_0(n)$ and $x_1(n)$. Calculate the squared magnitude of the Discrete Time Fourier Transform(DTFT) for $x_0(n)$ and $x_1(n)$ on a plurality of, e.g., 61, frequencies 0 Hz, +/−20 Hz, . . . ,+/−600 Hz, resulting in $F_0(k)$ and $F_1(k)$, k=1,2, . . . , 61. The carrier acquisition window (−600 Hz, +600 Hz) includes, for example, +/−500 Hz subscriber unit carrier uncertainty, as specified in the ReFLEX25/InFLEXion protocol and +/−100 Hz for the base receiver local oscillator (LO) uncertainty. The +/−100 Hz base receiver LO uncertainty assumes a GPS-trained LO (or equivalent) at the receiver 200.
  b) Non-coherent combining by $F(k)=F_0(k)+F_1(k)$, k=1, 2, . . . , 61.
  c) Search for the peak location $\hat{k}_0$ from F (k), resulting in an initial carrier estimate $\hat{f}_{e0}=20(\hat{k}_0-31)$. This initial carrier estimate $\hat{f}_{e0}$ can contain a residual error due to Doppler frequency shift. What follows is to remove the Doppler shift in $\hat{f}_{e0}$ by using a time-diversity approach. To maintain the accuracy of the carrier acquisition in slow fading and static cases, the timing synchronization pattern 304 is utilized in addition to the carrier acquisition segment 302 to provide a longer signal. The longer signal advantageously compensates for the accuracy loss due to the time-diversity combining described herein below.

Step 2. Correct the Carrier Error $\hat{f}_{e0}$ for the Entire Received Sync Portion 308.

Correct the carrier error $\hat{f}_{e0}$ estimated from step 1 for the entire sync portion 308 that includes the carrier acquisition segment 302 and the timing synchronization portion 304 by $$x_0(n)=e^{-j2\pi \hat{f}_{e0}n}x_0(n) \quad (3)$$

$$x_1(n)=e^{-j2\pi \hat{f}_{e0}n}x_1(n) \quad (4),$$

thereby producing a carrier-corrected sync portion.

Step 3. Remove the Timing Sync Signal From the Carrier-corrected Sync Portion.
  a) Estimate a timing error $T_e$ by determining the timing from the carrier-corrected sync portion, as follows. Calculate a squared magnitude correlation between the known timing synchronization pattern and the carrier-corrected received signal around a GPS-based search window of +/−300 us for each space-diversity branch, resulting in $R_0(l)$ and $R_1(l)$, l=1,2, . . . ,13 for a 20 KHz sampling rate. Non-coherent combining of the correlations gives $R(l)=R_0(l)+R_1(l)$, l=1, 2, . . . ,13. Search for the peak location $\hat{l}_0$ from the R(l), l=1,2, . . . ,13. The timing error relative to the GPS-based timing is then $T_e=(\hat{l}_0-6)$.
  b) Correct the timing error $T_e$ by $$x_0(n)=x_0(n-T_e) \quad (5)$$

$$x_1(n)=x_1(n-T_e) \quad (6).$$

c) Remove the timing sync pattern from the carrier-corrected received sync portion by $$x_0(n)=x_0(n)\bar{x}_{Sync}(n) \quad (7)$$

$$x_1(n)=x_1(n)\bar{x}_{Sync}(n) \quad (8)$$

where $x_{Sync}(n)$ is the timing synchronization pattern, and $\bar{x}_{Sync}(n)$ is the conjugate of $x_{Sync}(n)$. The result is that $x_0(n)$ and $x_1(n)$ now are two single-tone signals with an identical tone frequency, which is the residual error in $\hat{f}_{e0}$. The next step is to estimate this residual error.

Figure 5:
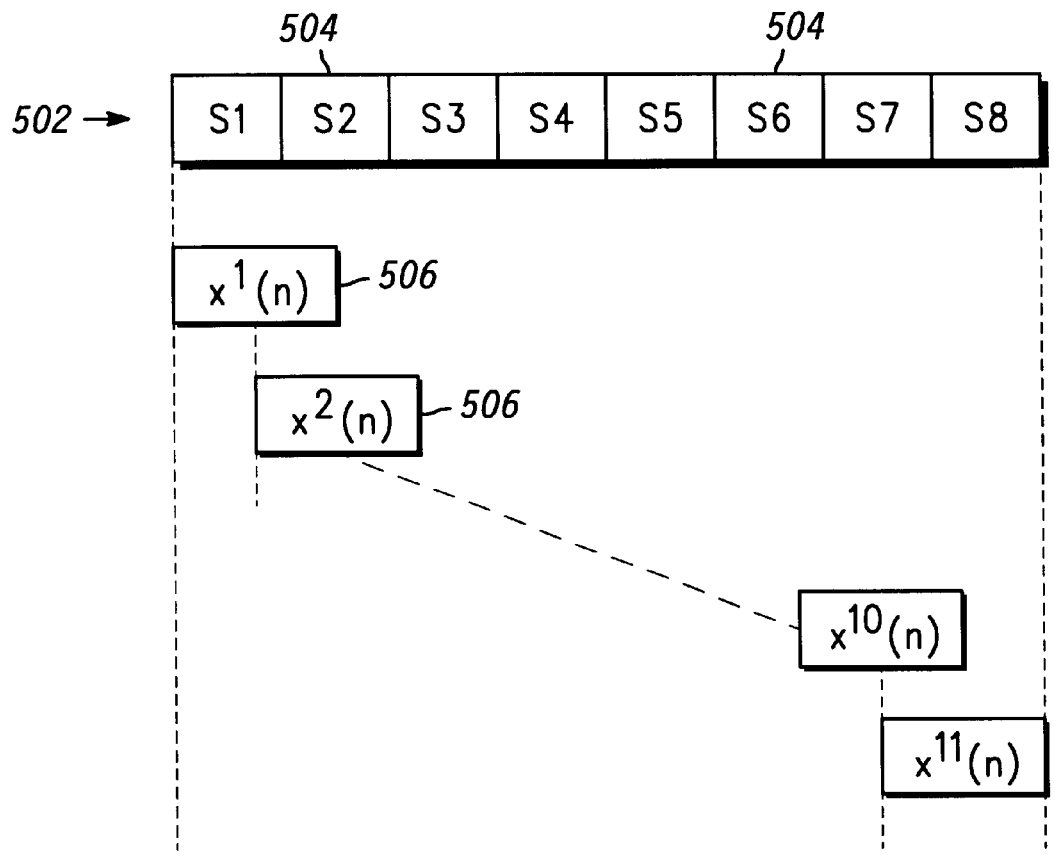
FIG. 5 is a timing diagram depicting a time-diversity technique of the communication receiver in accordance with the present invention.

Step 4. Estimate the Residual Error in $\hat{f}_{e0}$ by time-diversity combining.
  a) Separate the two single tone signals from step 3 into a plurality of overlapping time-diverse pieces, as depicted in FIG. 5. For an 800 bps inbound channel transmission rate, for example, and an eight-symbol sync portion 308, it has been empirically determined that separating the signal into 11 pieces with each piece for each space-diversity branch having 1.5 symbols and a 0.75 symbol overlap produces good results. FIG.5 depicts the symbols 504 of a single-tone signal 502, along with the pieces 506 used for obtaining time diversity.
  b) Calculate the squared magnitudes of the DTFTs for each piece 506 and each space-diversity branch at, for example, 11 frequencies 0 Hz, +/−20 Hz, . . . ,+/−100 Hz, resulting in $F_1^m(k)$, where l=−0,1 for the branch index, and m=1,2, . . . ,11 for the piece index, and k=1,2, . . . ,11 for the frequency index. Before the DTFT calculation, a half-sine wave window preferably is applied to each piece 506. This window is proven to improve the accuracy of the resulting carrier error estimate.

c) Combine the squared magnitude of the DTFTs $F_1^m(k)$ by $$F(k) = \sum_{l=1}^{2} \sum_{m=1}^{11} F_l^m(k), \quad k = 1, 2, \ldots, 11.$$

c) Search for the peak location $\hat{k}_1$ from $F(k)$, resulting in the residual frequency error estimate $\hat{f}_{e1}=20(\hat{k}_1-6)$.

Step 5. Finalize the carrier frequency error $\hat{f}_e=\hat{f}_{e0}+\hat{f}_{e1}$.

Simulations have demonstrated that the present invention advantageously provides a substantial sensitivity increase over prior art MSMF receivers in the presence of Doppler frequency shift. The simulations also have shown that the present invention does not negatively impact performance in the absence of Doppler frequency shift, compared to prior art MSMF receivers.

Thus, it should be clear from the preceding disclosure that the present invention advantageously provides a method and apparatus for facilitating an estimation of a carrier frequency error in a receiver of a wireless communication system, that mitigates the effects of Doppler frequency shift.

Many modifications and variations of the present invention are possible in light of the above teachings. Thus, it is to be understood that, within the scope of the appended claims, the invention can be practiced other than as specifically described herein above.

What is claimed is:

1. A method for facilitating an estimation of a carrier frequency error in a receiver of a wireless communication system, the method mitigating effects of Doppler frequency shift, the method comprising the steps of:

receiving a first signal comprising a sync portion including a carrier acquisition segment and a timing synchronization pattern;

calculating a first plurality of squared magnitude Fourier transforms at a first plurality of frequencies on the carrier acquisition segment;

deriving an initial carrier frequency error estimate by locating a peak in the first plurality of squared magnitude Fourier transforms;

correcting the sync portion according to the initial carrier frequency error estimate, thereby producing a carrier-corrected sync portion; and removing the timing synchronization pattern from the carrier-corrected sync portion, thereby producing a second signal having a residual carrier error.

2. The method of claim 1, wherein the receiving step comprises the step of receiving at least two space-diverse signals comprising the sync portion, and wherein the deriving step comprises the step of combining squared magnitude Fourier transforms calculated at the first plurality of frequencies on the carrier acquisition segment of each of the at least two space-diverse signals.

3. The method of claim 1, further comprising, prior to the removing step, the steps of:

estimating a timing error from the carrier-corrected sync portion; and correcting the timing error.

4. The method of claim 1, further comprising the steps of:

separating the second signal into a plurality of time-diverse pieces;

calculating a second plurality of squared magnitude Fourier transforms on each of the plurality of time-diverse pieces at a second plurality of frequencies;

combining ones of the second plurality of squared magnitude Fourier transforms calculated at identical ones of the second plurality of frequencies, thereby producing a time-diversity-combined plurality of values; and determining a residual frequency error estimate by locating a largest one of the time-diversity-combined plurality of values.

5. The method of claim 4, further comprising the step of:

estimating the carrier frequency error as a sum of the initial carrier frequency error estimate and the residual frequency error estimate.

6. The method of claim 4, wherein at least one of the deriving step and the calculating step comprises the step of performing a plurality of discrete-time Fourier transforms.

7. The method of claim 4, wherein the receiving step comprises the step of receiving at least two space-diverse signals comprising the sync portion, and wherein the combining step comprises the step of combining ones of the second plurality of squared magnitude Fourier transforms calculated at identical ones of the second plurality of frequencies on the carrier acquisition segment of each of the at least two space-diverse signals.

8. A receiver in a wireless communication system for facilitating an estimation of a carrier frequency error while mitigating effects of Doppler frequency shift, the receiver comprising:

a receiver element for receiving a first signal comprising a sync portion including a carrier acquisition segment and a timing synchronization pattern; and a processing system coupled to the receiver element for processing the sync portion, the processing system programmed to:

calculate a first plurality of squared magnitude Fourier transforms at a first plurality of frequencies on the carrier acquisition segment;

derive an initial carrier frequency error estimate by locating a peak in the first plurality of squared magnitude Fourier transforms;

correct the sync portion according to the initial carrier frequency error estimate, thereby producing a carrier-corrected sync portion; and remove the timing synchronization pattern from the carrier-corrected sync portion; thereby producing a second signal having a residual carrier error.

9. The receiver of claim 8, wherein the receiver element is arranged to receive at least two space-diverse signals comprising the sync portion, and wherein the processing system is further programmed to combine squared magnitude Fourier transforms calculated at the first plurality of frequencies on the carrier acquisition segment of each of the at least two space-diverse signals.

10. The receiver of claim 8, wherein the processing system is further programmed to:

estimate a timing error from the carrier-corrected sync portion; and correct the timing error prior to removing the timing synchronization pattern from the carrier-corrected sync portion.

11. The receiver of claim 8, wherein the processing system is further programmed to:

separate the second signal into a plurality of time-diverse pieces;

calculate a second plurality of squared magnitude Fourier transforms on each of the plurality of time-diverse pieces at a second plurality of frequencies;

combine ones of the second plurality of squared magnitude Fourier transforms calculated at identical ones of the second plurality of frequencies, thereby producing a time-diversity-combined plurality of values; and determine a residual frequency error estimate by locating a largest one of the time-diversity-combined plurality of values.

12. The receiver of claim 11, wherein the processing system is further programmed to:

estimate the carrier frequency error as a sum of the initial carrier frequency error estimate and the residual frequency error estimate.

13. The receiver of claim 11, wherein the processing system is further programmed to perform a plurality of discrete-time Fourier transforms.

14. The receiver of claim 11, wherein the receiver element is arranged to receive at least two space-diverse signals comprising the sync portion, and wherein the processing system is further programmed to combine ones of the second plurality of squared magnitude Fourier transforms calculated at identical ones of the second plurality of frequencies on the carrier acquisition segment of each of the at least two space-diverse signals.

* * * * *